Jan. 6, 1970  F. E. SANDERS  3,488,473
ELECTRIC BEVERAGE HEATER
Filed Oct. 6, 1967

INVENTOR.
Fred E. Sanders

United States Patent Office 3,488,473
Patented Jan. 6, 1970

3,488,473
ELECTRIC BEVERAGE HEATER
Fred E. Sanders, 503 E. 108th St.,
Cleveland, Ohio 44108
Filed Oct. 6, 1967, Ser. No. 673,349
Int. Cl. H05b 1/00
U.S. Cl. 219—281                                1 Claim

ABSTRACT OF THE DISCLOSURE

A heating device for the purpose of keeping coffee and other beverages hot by placing a specially designed and metal lined cup over an extension of the base containing a heating element, the heating element being wired in series with a pilot lamp, a fixed electrical contact and a leaf spring contact which is urged downward against the fixed electrical contact by the cup bearing down upon a button through the top of the base of the device.

---

This invention relates to heating devices and more particularly to a reheating apparatus for beverages.

It is therefore the main purpose of this invention to provide a beverage heater which will have a metal lined cup which rests upon a supported heating element within a base unit secured to a lunch counter.

Another object of this invention is to provide a beverage heater which will have a pilot light to indicate whether the device is operating and the base contains a leaf spring electrical contact which has secured to it a button extending through the top of the base, the base of the cup providing a means of urging the leaf spring contact against a fixed contact to the bottom of the base of the device, in order to complete the electrical circuit through the heating element.

A further object of this invention is to provide a beverage heater which will be placed near each of the individual stools at a lunch counter in restaurants.

Other objects of the present invention are to provide a beverage heater which is simple in design, inexpensive to manufacture, rugged in construction, easy to use and efficient in operation.

These and other objects will be readily evident upon a study of the following specification with the accompanying drawing wherein.

Figure 1:
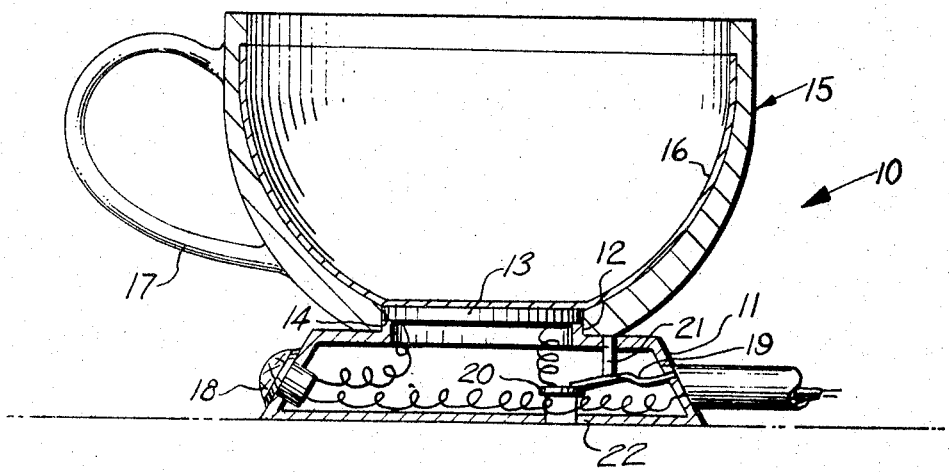
FIGURE 1 is a side view of the present invention shown in section.
Figure 2:
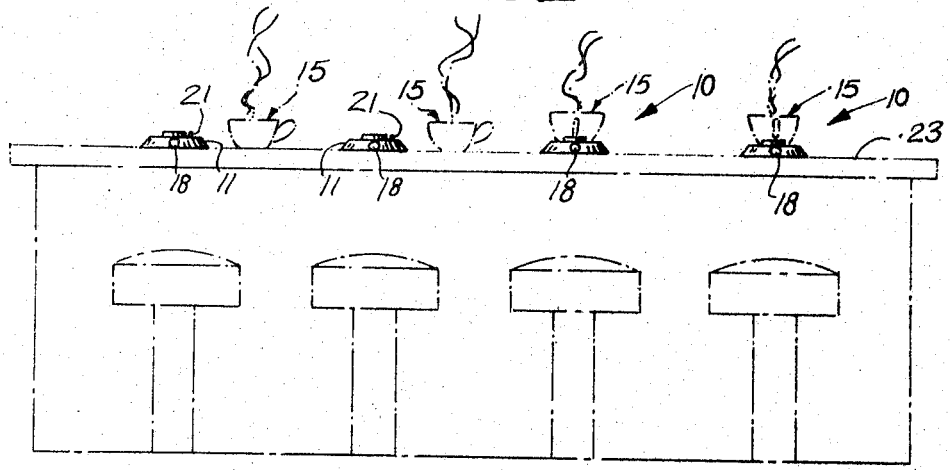
FIGURE 2 is a front view of a restaurant lunch counter showing the invention in operative use with the cups, lunch counter, and associated stools shown in phantom lines.

According to this invention, a beverage heater 10 is provided with a hollow frusto-conical base 11 having an upper hollow extension 12 above which is secured a circular heating element 13 which is received within a recessed opening 14 in the base of cup 15. Heating element 13 rests in abutment with a concaved metal insert 16 which is made into cup 15 during the process of manufacturing. Cup 15 is provided with the conventional handle 17 in order that it may be lifted. A pilot lamp 18 is secured within the side of base 11 and is wired in series with heating element 13 to provide a visual indication as to the operation of beverage heater 10. A leaf spring electrical contact 19 which is urged down and against the fixed electrical contact 20 by a push-button 21 in order to close the circuit of the heating element 13.

It will be noted that the bottom of the cup 15 serve to close the circuit by pressing downward upon button 21 which is slideable within the upper portion of base 11. The fixed electrical contact 20 is secured within the bottom wall 22 of base 11 and heater 10 is placed upon the lunch counter 23 for use.

In operation, the cup 15 containing a hot beverage such as coffee is placed so that the hollow extension 12 is received within the recessed opening 14 of cup 15. The action of placing cup 15 in this position forces the button 21 downward which in turn urges the leaf spring contact 19 against the fixed contact 20 which will close the series wired circuit within base 11 so that the heating element may transfer heat to the metal insert 16 of cup 15, thus keeping the beverage contained within cup 15 warm. When the cup 15 is removed from the extension 12 of base 11, the leaf spring contact 19 by its inherent springiness will return to open position which will then leave button 21 extending upwards from base 11.

While various changes may be made in the detailed construction, it is understood that such changes will be within the spirit and scope of the present invention as is defined by the appended claim.

What I now claim is:

1. A beverage reheating device, comprising in combination, a base and a cup removably mounted on said base, said base comprising a hollow frusto-conical member having an upper hollow extension, a circular heating element secured upon the upper end of said extension, one end of an electrical extension cord connected to said base, the other end of said cord having a plug receivable within an electric outlet socket of a house, a pilot lamp mounted upon a side of said base for visual observation, an electric switch within said base, said switch comprising a pivotable leaf spring and a fixed contact, an electrical circuit within said base comprising one end of said leaf spring being connected to a conductor of said cord, another conductor of said cord being connected in series to said lamp, heating element and said fixed contact, the opposite end of said leaf spring being selectively engageable or disengageable with said fixed contact, and said leaf spring having an upward extending push button positioned thereupon, said push button extending upwardly through an opening in a top wall shoulder formed around said upper extension of said base; said cup comprising a concave vessel that has an opening formed around a lip at an upper end thereof, said vessel having an ear for convenient grasp thereof, a concave metal insert secured to an inner side of said vessel, an opening through a bottom side of said vessel for receiving the said upper extension of said base thereinto, and said heating element thus contacting a bottom side of said metal insert when said cup is placed upon said base, said vessel having a peripheral bottom wall around said bottom opening, said bottom wall being in alignment to abut an upper end of said push button, and wherein said leaf spring is depressed by said button attached thereto, and said button when in normal position extends above said base of said device before said cup is placed in position over said extension of said base and when said button is in the full up position by the springiness of said leaf spring contact it clears said fixed contact and thus opens the circuit of said device until said cup is placed in position whereupon it urges said button downwards and its leaf spring contacts said fixed contact in order to complete said circuit.

References Cited

UNITED STATES PATENTS

| 1,567,679 | 12/1925 | Rittman et al. | 219—433 |
| 1,650,999 | 11/1927 | Preston | 219—433 X |
| 2,640,907 | 6/1953 | Morey | 219—437 X |
| 2,863,037 | 12/1958 | Johnstone | 219—436 X |

BERNARD A. GILHEANY, Primary Examiner

U.S. Cl. X.R.
219—429, 436